United States Patent [19]

Itagaki et al.

[11] Patent Number: 4,543,365

[45] Date of Patent: Sep. 24, 1985

[54] METHOD FOR INCREASING THE POROSITY OF A CROSS-LINKED COPOLYMER

[75] Inventors: Takaharu Itagaki, Yokohama; Tsuyoshi Ito; Kiyoto Ando, both of Machida; Hiromi Teshima, Yamato, all of Japan

[73] Assignee: Mitsubishi Chemical Industries Ltd., Tokyo, Japan

[21] Appl. No.: 694,276

[22] Filed: Jan. 24, 1985

[30] Foreign Application Priority Data

Feb. 2, 1984 [JP] Japan ................................. 59-17524

[51] Int. Cl.$^4$ ............................................... C08J 9/00
[52] U.S. Cl. ....................................... 521/53; 521/146; 525/332.1; 525/332.2; 525/337; 525/370
[58] Field of Search ............... 521/53, 146; 525/332.1, 525/332.2, 337, 370

[56] References Cited

U.S. PATENT DOCUMENTS 4,191,813  3/1980  Reed et al. ............................ 521/31

*Primary Examiner*—Morton Foelak
*Attorney, Agent, or Firm*—Oblon, Fisher, Spivak, McClelland & Maier

[57] ABSTRACT

A method for increasing the porosity of a cross-linked copolymer composed essentially of at least one monovinyl aromatic compound selected from the group consisting of styrene, vinyl toluene and ethyl vinyl benzene, at least one polyvinyl aromatic compound selected from the group consisting of divinyl benzene, trivinyl benzene, divinyl toluene and divinyl xylene, and an aliphatic vinyl compound, wherein the proportion of the polyvinyl aromatic compound relative to the total vinyl compounds is from 8 to 80% by weight, and the proportion of the aliphatic vinyl compound relative to the total vinyl compounds is from 0 to 20% by weight, which method comprises treating particles of said copolymer with a Lewis acid catalyst in an amount of from 0.05 to 1 part by weight relative to 1 part by weight of the copolymer particles, in the presence of an organic solvent.

4 Claims, No Drawings

METHOD FOR INCREASING THE POROSITY OF A CROSS-LINKED COPOLYMER

The present invention relates to a method for increasing the porosity of an aromatic cross-linked copolymer and a porous aromatic cross-linked copolymer obtained by the method. More particularly, the present invention relates to a method for increasing the porosity by treating, with a Lewis acid catalyst, a spherical cross-linked copolymer prepared from a monovinyl aromatic compound and a non-conjugated polyvinyl aromatic compound as the major starting materials, and a porous aromatic cross-linked copolymer obtained by the method. When the spherical cross-linked copolymer is already porous, the porosity can be increased by the method of the present invention.

The porous aromatic cross-linked copolymer obtained by the method of the present invention is useful as an adsorbent for an organic compound present in water, and is also useful as a matrix material for ion exchange resins or chelate resins. Heretofore, among non-polar or weakly polar spherical cross-linked polymers, porous cross-linked copolymers with their specific surface area and pore volume adequately developed are called synthetic adsorbents, which are widely used as adsorbents for organic substances present in water, by utilizing the physical adsorption on their surface.

Methods for the preparation of such porous cross-linked copolymers are known. For instance, there may be mentioned (1) a method wherein a monovinyl aromatic compound and a polyvinyl aromatic compound are suspension-polymerized in water in the presence of an organic solvent which is uniformly miscible with the starting monovinyl aromatic compound and polyvinyl aromatic compound, but which is inactive for polymerization and does not swell the resulting cross-linked copolymer, and after the polymerization, the solvent is removed from the formed cross-linked copolymer, and (2) a method wherein a monovinyl aromatic compound and a polyvinyl aromatic compound are suspension-polymerized in water with an addition of a plasticizer or a linear polymer soluble in the mixture of the starting material vinyl compounds, and after the polymerization, the added plasticizer or linear polymer is extracted and removed from the formed cross-linked copolymer.

However, according to these methods, the pores in the polymer are formed during the polymerization. Therefore, if an attempt is made to substantially develop the pores, the resin strength tends to decrease substantially. Accordingly, the proportion of pores is necessarily limited. Thus, it has been difficult to produce a product having a high porosity.

On the other hand, U.S. Pat. No. 4,191,813 discloses a method wherein lightly cross-linked vinyl benzyl chloride copolymer beads having halomethyl groups are brought into contact with a small amount of a Lewis acid catalyst in the presence of a swelling agent to cross-link the halomethyl groups to each other. In this method, it is essential to use a polymer containing halomethyl groups as the starting material polymer. Further, the amount of the Lewis acid catalyst is as small as from 0.5 to 5% by weight relative to the polymer.

It is an object of the present invention to provide a method for increasing the porosity of an aromatic cross-linked copolymer having no halomethyl group by means of a principle which is entirely different from the above-mentioned conventional methods.

Another object of the present invention is to provide a porous aromatic cross-linked copolymer having characteristics useful as a synthetic adsorbent.

Namely, the present invention provides a method for increasing the porosity of a cross-linked copolymer composed essentially of at least one monovinyl aromatic compound selected from the group consisting of styrene, vinyl toluene and ethyl vinyl benzene, at least one polyvinyl aromatic compound selected from the group consisting of divinyl benzene, trivinyl benzene, divinyl toluene and divinyl xylene, and an aliphatic vinyl compound, wherein the proportion of the polyvinyl aromatic compound relative to the total vinyl compounds is from 8 to 80% by weight, and the proportion of the aliphatic vinyl compound relative to the total vinyl compounds is from 0 to 20% by weight, which method comprises treating particles of said copolymer with a Lewis acid catalyst in an amount of from 0.05 to 1 part by weight relative to 1 part by weight of the copolymer particles, in the presence of an organic solvent.

Now, the present invention will be described in detail with reference to the preferred embodiments.

The aromatic cross-linked copolymer useful for the method of the present invention, can be produced by a per se known process, and is usually a spherical cross-linked copolymer. The spherical cross-linked copolymer is composed essentially of at least one monovinyl aromatic compound and at least one polyvinyl aromatic compound, and optionally an aliphatic vinyl compound.

As the monovinyl aromatic compound, there may be mentioned styrene, vinyl toluene and ethyl vinyl benzene.

As the polyvinyl aromatic compound, there may be mentioned divinyl benzene, trivinyl benzene, divinyl toluene and divinyl xylene.

The proportions of the monovinyl aromatic compound and the polyvinyl aromatic compound may be optionally varied. However, the proportion of the polyvinyl aromatic compound as the cross-linking agent is from 8 to 80% by weight, preferably from 15 to 60% by weight, relative to the total vinyl compounds. If the amount of the polyvinyl compound is too small beyond the lower limit of 8%, cracking of resin beads or a decrease in the strength of the resin is likely to be led during the treatment with the Lewis acid catalyst according to the method of the present invention. On the other hand, if the amount exceeds 80% by weight, severe reaction conditions are required for the treatment with the Lewis acid catalyst, such being undesirable from the industrial point of view.

In addition to the above aromatic vinyl compounds, the spherical cross-linked copolymer may contain an aliphatic vinyl compound in an amount of from 0 to 20% by weight relative to the total vinyl compounds. As such an aliphatic vinyl compound, there may be mentioned an aliphatic monovinyl compound such as methyl methacrylate, acrylonitrile, 2-hydroxyethyl methacrylate, methacrylic acid or ethyl acrylate, or an aliphatic polyvinyl compound such as ethylene glycol dimethacrylate or trimethylol propane trimethacrylate.

The above-mentioned monovinyl aromatic compound and polyvinyl aromatic compound are suspension-polymerized, optionally together with the above-mentioned aliphatic vinyl compound, in accordance with a conventional method. As the polymerization initiator for the suspension polymerization, there may be employed benzoyl peroxide, lauroyl peroxide, t-butyl hydroperoxide or azobisisobutyronitrile usually in an amount of from 0.5 to 5% by weight relative to the total monomers i.e. the total vinyl compounds. The polymerization temperature may vary depending upon the type of the polymerization initiator or the concentration. However, the polymerization temperature is usually selected within a range of from 40° to 90° C.

The spherical cross-linked copolymer to be used in the present invention may be porous or in a gel state. However, if it is intended to obtain a product useful as a synthetic adsorbent, it is better to employ a porous spherical cross-linked copolymer as the starting material, whereby the effectiveness of the present invention will be substantial.

In the present invention, a porosity is imparted to the above-mentioned spherical cross-linked copolymer by treating the copolymer with a Lewis acid catalyst. As such a Lewis acid catalyst, an aprotic catalyst active for Friedel-Crafts reaction is useful which comprises a metal halide such as aluminum chloride, ferric chloride, boron trifluoride, zinc chloride, titanium tetrachloride, stannic chloride or aluminum bromide.

The amount of the Lewis acid catalyst varies depending upon the porosity to be imparted to the resin and the catalytic activity of the particular catalyst used. However, it is usual to employ the catalyst within a range of from 0.05 to 1.0 g relative to 1 g of the cross-linked copolymer.

For the treatment of the cross-linked copolymer with the Lewis acid catalyst according to the present invention, it is usually preferred to conduct the treatment in an organic solvent which is inactive to the reaction and which is capable of swelling the cross-linked, copolymer. As such a solvent, there may be mentioned nitromethane, nitrobenzene, dichloroethane or o-dichlorobenzene. The solvent for swelling is used in an amount sufficient to let the cross-linked copolymer swell adequately and to carry out the reaction, and is usually within a range of from 1 to 10 ml relative to 1 g of the cross-linked copolymer.

The treatment of the cross-linked copolymer with the Lewis acid catalyst is usually conducted at a temperature of from 0° to 80° C. for from 1 to 20 hours.

After conducting the treatment with the Lewis acid catalyst, water, an aqueous hydrochloric acid solution or an aqueous alkaline solution is added to this reaction system to deactivate the Lewis acid as a Friedel-Craft catalyst, and hydrolytic product of the Lewis acid catalyst is extracted to the aqueous layer side, whereby the reaction is terminated. On the other hand, the removal of the solvent for swelling from the cross-linked copolymer can be conducted by azeotropic distillation after introducing the cross-linked copolymer into water, or by washing with a water-soluble organic solvent such as acetone or methanol, followed by washing with water.

The reason why the cross-linked aromatic copolymer is made porous by such treatment with the Lewis acid catalyst, is not clear. However, it is believed that the cross-linked aromatic copolymer swelled by the solvent, is treated with the Lewis acid catalyst, whereby the breakage of the cross-linkage and re-alkylation take place in the swelled state, and thus a porous structure is formed.

According to such a method of the present invention, it is possible to readily obtain porous cross-linked copolymer particles having a specific surface area of from 400 to 2000 m$^2$/g and a pore volume of from 0.1 to 2.0 ml/g. In particular, it is possible to readily obtain a highly porous cross-linked copolymer having a high proportion of pores, which used to be difficult to produce, i.e. porous cross-linked aromatic polymer particles having the above-mentioned specific surface area and pore volume and in which the proportion of the pore volume of pores having a pore radius of not greater than 200 Å constitutes at least 40%, preferably at least 50%.

The porous cross-linked copolymer particles of the present invention thus obtained are useful as an adsorbent for a substance, such as Cephalosporin C, to which the conventional adsorbent has been hardly applicable. Further, the porous cross-linked copolymer particles of the present invention can be led to an ion exchange resin or chelate resin by sulfonation or chloromethylation, followed by amination.

Now, the present invention will be described in further detail with reference to Examples. However, it should be understood that the present invention is by no means restricted to these specific Examples.

In the Examples, the specific surface area was measured by BET method by means of nitrogen adsorption. For the determination of the water content, the water-containing copolymer was placed in a centrifugal separator having a basket with a diameter of 20 cm, subjected to centrifugal separation at a rotational speed of 3000 rpm for 5 minutes, and then measured for the weight Pw. Then, the copolymer was dried under a pressure of 10 mmHg at 80° C. for 8 hours, and the dried weight Pd was measured. From these values, the water content (%) and the pore volume were calculated by the following formulas.

$$\text{Water content (\%)} = \frac{Pw - Pd}{Pw} \times 100$$

$$\text{Pore volume (ml/g)} = \frac{\text{Water content \%}}{100 - \text{Water content \%}}$$

Further, the proportion of the pore volume of pores having a pore radius of not greater than 200 Å relative to the total pore volume, was obtained by dividing the pore volume of the pores having a radius of not greater than 200 Å as measured by nitrogen adsorption according to BET method, with the total pore volume.

EXAMPLE 1

To 20 g of a geled polystyrene polymer cross-linked with 16% of divinyl benzene, 100 ml of dichloroethane was added, and the polymer was swelled at room temperature for 1 hour. Then, 4 g of anhydrous aluminum chloride was added, and the mixture was stirred at 40° C. for 5 hours and at 60° C. for 3 hours under heating.

After the completion of the reaction, 100 ml of water was added and the mixture was stirred at room temperature for 4 hours, and then filtered. The cross-linked copolymer was transferred to a column and washed successively with 500 ml of acetone, 500 ml of methanol and 500 ml of water, whereby 67 ml of a porous cross-linked copolymer was obtained. The characteristics of the resin thus obtained are shown in Table 1.

EXAMPLE 2

To 100 g of a styrene-divinyl benzene cross-linked copolymer (dried product of Diaion HP21 (trademark), manufactured by Mitsubishi Chemical Industries, Ltd.), 500 ml of dichloroethane was added, and the copolymer was swelled at room temperature for 1 hour. Then, 68 g of anhydrous stannic chloride was added, and the mixture was stirred at 60° C. for 8 hours.

After the completion of the reaction, 500 ml of water was added, and the mixture was treated in the same manner as in Example 1 and then washed with 2 liters of acetone, 2 liters of methanol and 2 liters of water in the same manner as in Example 1, whereby 340 ml of a resin was obtained. The characteristics of the resin thus obtained are shown in Table 1.

EXAMPLE 3

By using 100 g of a porous cross-linked copolymer comprising 50% of divinyl benzene (purity: 56.7%), 5% of methyl methacrylate and 6.8% of styrene as the starting material, the treatment was conducted in the same manner as in Example 2 except that 500 ml of nitrobenzene was used as the solvent for swelling and 113 g of zinc chloride was used as the Lewis acid catalyst, whereby 287 ml of a porous cross-linked copolymer was obtained. The characteristics of the resin thus obtained are shown in Table 1.

2000 ppm Cephalosporin C solution was accurately determined.

From these values, the amount of adsorption (g) of Cephalosporin C per liter of the resin was obtained in accordance with the following equation.

Amount of adsorption of Cephalosporin C (g/liter) = $(A_O - A) \times 0.1/5.0$

Since the equilibrium concentration for this value differs case by case, an isothermal adsorption curve was separately prepared by varying the concentration of Cephalospolin C, and the amount of equilibrium adsorption at 2000 ppm of Cephalospolin C was obtained from the isothermal adsorption curve.

The results are shown in Table 2.

For the measurement of the absorbance, a double beam spectrophotometer Model 200-20 (manufactured by Hitachi, Ltd.) was employed and a 1 cm quartz cell was used.

TABLE 2

Amount of adsorption of Cephalosporin C (g/liter resin)

TABLE 1

Characteristics of the resins treated by the present invention and the untreated resins

|  |  | Outer appearance | Water content % | Pore volume ml/g | Specific surface area m²/g | Proportion of the pore volume of pores having a radius of not greater than 200 Å relative to the total pore volume % |
|---|---|---|---|---|---|---|
| Example 1 | Untreated | Colorless transparent | 0.0 | 0.0 | 0 | — |
|  | Treated | White, opaque | 56.1 | 1.280 | 82 | 88.6 |
| Example 2 | Untreated | White, opaque | 54.0 | 1.174 | 583 | 63.9 |
|  | Treated | White, opaque | 58.2 | 1.392 | 891 | 66.3 |
| Example 3 | Untreated | White, opaque | 40.7 | 0.686 | 534 | 45.9 |
|  | Treated | White, opaque | 47.0 | 0.887 | 838 | 59.2 |

TEST EXAMPLE 1

Evaluation of the properties of the treated porous resins (comparison in the performance of the adsorption of Cephalosporin C)

To 100 ml of an aqueous solution (the pH was adjusted to 2.5 with hydrochloric acid) containing 2000 ppm of Cephalosporin C, 5.00 ml of the treated porous resin obtained in each Example or the untreated resin as the starting material, was added. The mixture was shaken at 25° C. for 5 hours. Then, the supernatant liquid was taken, and the absorbance at 260 mμm was measured. From a calibration curve separately prepared by measuring the absorbance at various concentrations of Cephalosporin C, the Cephalosporin C concentration (A) in the supernatant liquid was obtained. In the same manner, the Cephalosporin C concentration ($A_0$) of the

|  | Amount of adsorption of Cephalosporin C (g/liter) | |
|---|---|---|
|  | Untreated resin | Resin treated by the present invention |
| Example 1 | 0 | 12 |
| Example 2 | 42 | 70 |
| Example 3 | 51 | 74 |

EXAMPLES 4 AND 5

20 g of a geled cross-linked polystyrene comprising 15% of a cross-linking agent, 10% of an aliphatic vinyl compound and styrene, was treated in the same manner as in Example 1 to obtain a porous cross-linked copolymer. The characteristics of the resin thus obtained are shown in Table 3. The water content, pore volume and specific surface area of each cross-linked copolymer prior to the treatment by the present invention were substantially zero.

TABLE 3

Characteristics of the resins treated by the present invention

|  | Cross-linking agent | Aliphatic vinyl monomer | Water content % | Pore volume ml/g | Specific surface area m²/g | Proportion of the pore volume of pores having a radius of not greater than 200 Å relative to the total pore volume % |
|---|---|---|---|---|---|---|
| Example 4 | DVT | AN | 16.8 | 0.32 | 76 | 90 |
| Example 5 | TVB | EGDM | 14.2 | 0.26 | 83 | 89 |

DVT: Divinyl toluene
AN: Acrylonitrile
TVB: Trivinyl benzene
EGDM: Ethylene glycol dimethacrylate

We claim:

1. A method for increasing the porosity of a cross-linked copolymer composed essentially of at least one monovinyl aromatic compound selected from the group consisting of styrene, vinyl toluene and ethyl vinyl benzene, at least one polyvinyl aromatic compound selected from the group consisting of divinyl benzene, trivinyl benzene, divinyl toluene and divinyl xylene, and an aliphatic vinyl compound, wherein the proportion of the polyvinyl aromatic compound relative to the total vinyl compounds is from 8 to 80% by weight, and the proportion of the aliphatic vinyl compound relative to the total vinyl compounds is from 0 to 20% by weight, which method comprises treating particles of said copolymer with a Lewis acid catalyst in an amount of from 0.05 to 1 part by weight relative to 1 part by weight of the copolymer particles, in the presence of an organic solvent.

2. The method according to claim 1, wherein the Lewis acid catalyst is a metal halide.

3. The method according to claim 1, wherein the organic solvent is a solvent capable of swelling the cross-linked copolymer.

4. The method according to claim 1, the treatment is conducted by mixing the copolymer particles with the Lewis acid catalyst at a temperature of from 0° to 80° C.

* * * * *